(12) United States Patent
Yin et al.

(10) Patent No.: US 11,326,885 B2
(45) Date of Patent: May 10, 2022

(54) INERTIAL MEASUREMENT DEVICE AND UNMANNED AERIAL VEHICLE

(71) Applicant: Shanghai Topxgun Robotics Co., Ltd., Shanghai (CN)

(72) Inventors: Liangliang Yin, Shanghai (CN); Lianjie Gao, Shanghai (CN); Shaobin Li, Shanghai (CN); Yu Zhang, Shanghai (CN)

(73) Assignee: Shanghai Topxgun Robotics Co., Ltd., Shanghai (CN)

( * ) Notice: Subject to any disclaimer, the term of this patent is extended or adjusted under 35 U.S.C. 154(b) by 254 days.

(21) Appl. No.: 16/088,462

(22) PCT Filed: May 16, 2017

(86) PCT No.: PCT/CN2017/084484
§ 371 (c)(1),
(2) Date: Sep. 26, 2018

(87) PCT Pub. No.: WO2018/196042
PCT Pub. Date: Nov. 1, 2018

(65) Prior Publication Data
US 2021/0095964 A1  Apr. 1, 2021

(30) Foreign Application Priority Data
Apr. 28, 2017 (CN) .......................... 201710292749.1

(51) Int. Cl.
*G01C 21/16* (2006.01)
*B64C 39/02* (2006.01)
*G01C 5/06* (2006.01)

(52) U.S. Cl.
CPC .......... *G01C 21/165* (2013.01); *B64C 39/024* (2013.01); *G01C 5/06* (2013.01); *B64C 2201/141* (2013.01)

(58) Field of Classification Search
CPC ........ G01C 21/165; G01C 5/06; G01C 25/00; G01C 21/265; G01C 21/18; B64C 39/024; B64C 2201/141
See application file for complete search history.

(56) References Cited

U.S. PATENT DOCUMENTS

2017/0059319 A1\* 3/2017 Feng .................... G01C 21/265

FOREIGN PATENT DOCUMENTS

| CN | 104931054 A | 9/2015 |
| CN | 204757990 U | 11/2015 |

(Continued)

OTHER PUBLICATIONS

Supplementary European Search Report and Annex to the European Search Report on European Patent Application No. EP 17 90 2587.9, dated Oct. 24, 2019 (16 pages).

(Continued)

*Primary Examiner* — Tarun Sinha
*Assistant Examiner* — Matthew W. Baca
(74) *Attorney, Agent, or Firm* — Buchanan Ingersoll & Rooney PC

(57) ABSTRACT

An inertial measurement device includes: a shell, sensor components and vibration damping components installed in the shell. The sensor components include an integrated circuit board, an inertial sensor connected to the integrated circuit board, and a barometric sensor connected to the integrated circuit board. The vibration damping components include a first cushion, a first weighting piece, a second weighting piece and a second cushion which are connected successively. An accommodating cavity for accommodating the integrated circuit board is formed between the first weighting piece and the second weighting piece. The first weighting piece includes a holding cavity for accommodating the inertial sensor and a pressure chamber accommo- (Continued)

dating the barometric sensor and communicating with the exterior of the inertial measurement device.

8 Claims, 5 Drawing Sheets

(56) References Cited

FOREIGN PATENT DOCUMENTS

| | | | |
|---|---|---|---|
| CN | 205664838 U | | 10/2016 |
| CN | 205748395 U | * | 11/2016 |
| CN | 205748395 U | | 11/2016 |
| CN | 205957985 U | * | 2/2017 |
| CN | 205957985 U | | 2/2017 |
| CN | 206038016 U | | 3/2017 |
| FR | 2886724 A1 | | 12/2006 |

OTHER PUBLICATIONS

International Search Report for PCT/CN2017/084484 dated Jan. 24, 2018 (Chinese).

* cited by examiner

INERTIAL MEASUREMENT DEVICE AND UNMANNED AERIAL VEHICLE

CROSS REFERENCE TO RELATED APPLICATIONS

This application is the United States national phase under 35 U.S.C. § 371 of PCT International Patent Application No. PCT/CN2017/084484, filed on May 16, 2017, which claims benefit of priority of Chinese Application No. 201710292749.1, filed on Apr. 28, 2017.

TECHNICAL FIELD

The present disclosure relates to the field of unmanned aerial vehicle, and in particular to an inertial measurement device and an unmanned aerial vehicle.

BACKGROUND

Inertial measurement devices are core modules of control systems of unmanned aerial vehicle. The date, which are captured by an inertial sensor and a barometric sensor, are analyzed to obtain attitude information and location information of an unmanned aerial vehicle, and to realize complete autonomous navigation.

In the field of unmanned aerial vehicle, violent random vibration of the unmanned aerial vehicle is the main mechanical environment faced by an inertial measurement device. The vibration can not only cause a relatively large noise in an output signal of the inertial measurement device in measurement, leading to a data distortion and a lower precision of measurement, but also damage the electronic components in the inertial measurement device.

In addition, in the flight of the unmanned aerial vehicle, because of the high speed and a large altitude difference, the turbulent airflow at a high speed in the flight environment may influence the barometric sensor in the inertial measurement device, and thus result in a fluctuation or even a serious deviation in the data measured by the barometric sensor.

SUMMARY

The present disclosure provides an inertial measurement device and an unmanned aerial vehicle.

An inertial measurement device is provided, which includes: a shell, sensor components and vibration damping components installed in the shell, the sensor components include an integrated circuit board, an inertial sensor connected to the integrated circuit board, and a barometric sensor connected to the integrated circuit board;

the vibration damping components include a first cushion, a first weighting piece, a second weighting piece and a second cushion which are connected successively, at least one accommodating cavity for accommodating the integrated circuit board is formed between the first weighting piece and the second weighting piece, the first weighting piece has the holding cavity for accommodating the inertial sensor and a pressure chamber accommodating the barometric sensor and communicating with an exterior of the inertial measurement device.

In one or more embodiments, an airflow channel communicating with the exterior of the inertial measurement device is formed in the top surface of the first weighting piece, and the first weighting piece has baroports for connecting the airflow channel to the pressure chamber.

In one or more embodiments, the airflow channel includes a T-shaped channel, peripheral channels, and inner channels which are symmetrically connected to the T-shaped channel. The inner channels each is connected to a respective one of the peripheral channels. Two of the peripheral channels are connected to each other and each has an air inlet, two of the baroports are symmetrically connected to two ends of the T-shaped channel.

In one or more embodiments, the T-shaped channel includes a transverse channel and a longitudinal channel connected to a midpoint of the transverse channel. Two of the baroports are symmetrically connected to ends of the transverse channel. The inner channels are symmetrically connected to the longitudinal channel.

In one or more embodiments, the inertial measurement device includes at least one structure of a group consisting of:

the bottom surface of the first cushion is fastened to the top surface of the first weighting piece by means of an adhesive plate, and the airflow channel is formed between the first weighting piece and the adhesive plate; and the bottom surface and the top surface of the second cushion are respectively fastened to the shell and the bottom surface of the second weighting piece.

In one or more embodiments, the shell includes an annular housing, a first metal sheet and a second metal sheet. The first metal sheet and the second metal sheet are respectively located on a top surface and a bottom surface of the annular housing. The sensor components and the vibration damping components are arranged in the annular housing and are compressed by the first metal sheet and the second metal sheet.

In one or more embodiments, opposite edges of the first metal sheet each extends at least one first male tab towards the annular housing. Opposite edges of the second metal sheet each extends at least one second male tab towards the annular housing. The at least one first male tab and the at least one second male tab are inserted into the annular housing and contacting with an inwall of the annular housing.

In one or more embodiments, the first weighting piece includes a sealing cover. A surface of the pressure chamber, facing the second weighting piece, is connected to the sealing cover. The sealing cover segregates the pressure chamber and the accommodating cavity.

In one or more embodiments, the accommodating cavity is filled with thermally conductive silicone grease.

An unmanned aerial vehicle is provided, which includes any inertial measurement device described hereinabove.

The structure described above not only improves the integration level of the entire inertial measurement device, but also decrease the interference of outside factors to the measurement performed by the inertial sensor and barometric sensor, thereby improving the precision of measurement of the inertial measurement device.

Figure 1:
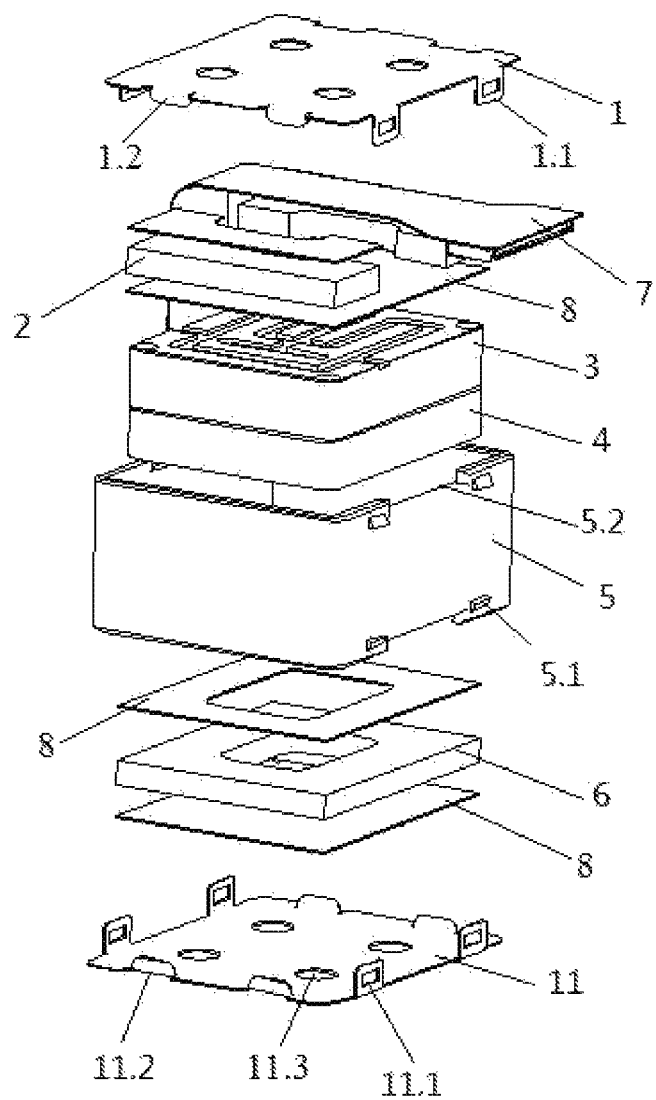
FIG. 1 is an exploded structure diagram of an inertial measurement device according to an embodiment of the present disclosure.

In the drawings:
1: upper metal sheet; 1.1: first snap ring; 1.2: first male tab;
2: first vibration darning cushion;
3: first weighting piece; 3.1: holding cavity; 3.2: pressure chamber; 3.3: baroports; 3.4: peripheral channels; 3.5: inner channels; 3.6: T-shaped channel; 3.7: air inlet; 3.8: sealing cover; 3.9: first connecting holes; 3.61: transverse channel; 3.62: longitudinal channel; 3.81: blind-hole;
4: second weighting piece; 4.1: second connecting holes; 4.2: arc-shaped surface;
5: annular housing; 5.1: buckle; 5.2: notch;
6: second cushion;
7: second flexible flat cable;
8: adhesive plate;
9: second integrated circuit board;
10: first integrated circuit board; 10.1: hypotenuse;
11: lower metal sheet; 11.1: second snap ring; 11.2: second male tab; 11.3: through-hole.

DETAILED DESCRIPTION

In the related art: (1) the existing inertial measurement devices are bulky, heavy and have a low integration level, while it is difficult to achieve the overall light weight of the inertial measurement device and ensure that the strength and stiffness of the structure of the inertial measurement devices to meet the actual requirements at the same time; (2) the effect of vibration damping is poor in the case where only the displacement of the integrated circuit board provided with an inertial sensor is limited to reduce the influence of the vibration frequency on the inertial sensor, it is thus difficult to ensure the stable and reliable operation of the aircraft.

This embodiment provides an inertial measurement device, as shown in FIG. 1 to FIG. 8. The inertial measurement device includes a shell, sensor components and vibration damping components. The sensor components and the vibration damping components are installed in the shell.

Figure 2:
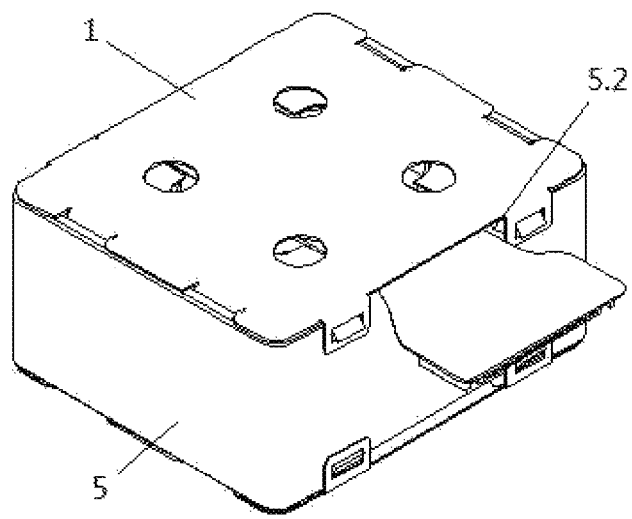
FIG. 2 is an overall structure diagram of an inertial measurement device according to an embodiment of the present disclosure.

As shown in FIG. 1 and FIG. 2, the shell includes an annular housing 5, as well as an upper metal sheet 1 and a lower metal sheet 11, which are respectively located on and below the annular housing 5. The sensor components and the vibration damping components described above are disposed in the annular housing 5 and supported by the lower metal sheet 11.

In one or more embodiments, the opposite edges of the upper metal sheet 1 each extends at least one snap ring, the opposite edges of the lower metal sheet 11 each extend at least one snap ring. In this embodiment, the snap ring on the upper metal sheet 1 may be called as first snap ring 1.1, the snap ring on the lower metal sheet 11 may be called as second snap ring 11.1. In one or more embodiments. Buckles 5.1 are set at positions of the annular housing 5 corresponding to the snap rings. Through the interlocking between the buckles 5.1 and the snap rings, the annular housing 5 is respectively buckled with the upper metal sheet 1 and the lower metal sheet 11. In this embodiment, each of the two edges of the upper sheet metal 1 may be provided with two snap rings, and each of the two edges of the lower sheet metal 11 may be provided with two snap rings. Correspondingly, the number of buckles 5.1 arranged on the side surface of the annular housing 5 is the same as the number of the snap rings.

In this embodiment, at least one notch 5.2 may be set on the annular housing 5. The notch 5.2 may form an air inlet channel with at least one of the upper metal sheet 1 and the lower metal sheet 11, and the air may enter the shell through the air inlet channel.

In one or more embodiments, the two edges, adjacent to the first snap rings on the upper metal sheet 1, each extends two male tabs towards the annular housing 5. The two edges, adjacent to the second snap rings on the lower sheet metal 11, each extend two male tabs towards the annular housing 5. In this embodiment, the male tabs on the upper metal sheet 1 may be called as first male tabs 1.2, and the male tabs on the lower metal sheet 11 may be called as second male tabs 11.2. The male tabs may be inserted into the annular housing 5 and may contact with the inwall of the annular housing 5. The male tabs on the one hand serves as stiffeners, so as to prevent the annular housing 5 from deforming, improve the rigidity of the annular housing. The male tabs on the other hand enable the connection between the upper metal sheet 1 and the annular housing 5 as well as the connection between the lower metal sheet 11 and the annular housing 5 to be securer. The male tabs fix the sensor components and the vibration damping components installed in the annular housing 5.

In this embodiment, after the sensor components and the vibration damping components are disposed in the annular housing 5, the sensor components and the vibration damping components may be compressed in the annular housing 5 by means of the first metal sheet 1 and the second metal sheet 11, which makes the structure of the inertial measurement device stable. The fact that the sensor components and the vibration damping components are disposed in the annular housing 5 can reduce the influence of external environment on the precision of measurement of sensor components, protect the vibration damping components, avoid exposure of the vibration damping components, lengthen the service life of the vibration damping components, make the vibration damping components firmly installed and hard to fall off, and improve the damping effect of the vibration damping components.

In one or more embodiments, there are four through-holes 11.3 arranged on the surface of the lower metal sheet 11 (as shown in FIG. 1), and the successive connection of the four through-holes 11.3 forms a quadrangle. When the inertial measurement device installed in the shell (not shown) of a control device (not shown), two convex platforms (not shown) may be arranged on the bottom surface of the shell of the control device. The two convex platforms are arranged at positions corresponding to two diagonal through-holes 11.3 of the four through-holes 11.3. Since the convex platforms are arranged in the two through-holes 11.3, the position of the inertial measurement device is relatively fixed, so as to avoid the shaking of the inertial measurement device installed in the shell.

In this embodiment, the vibration damping components and the sensor components integrally fixed in the annular housing 5, and are fixed by means of the upper metal sheet 1 and the lower metal sheet 11. This can limit the relative movement of the parts of the vibration damping components and the sensor components, strengthen the rigidity of the inertial measurement device, and reduce the vibration of the parts.

Figure 3:
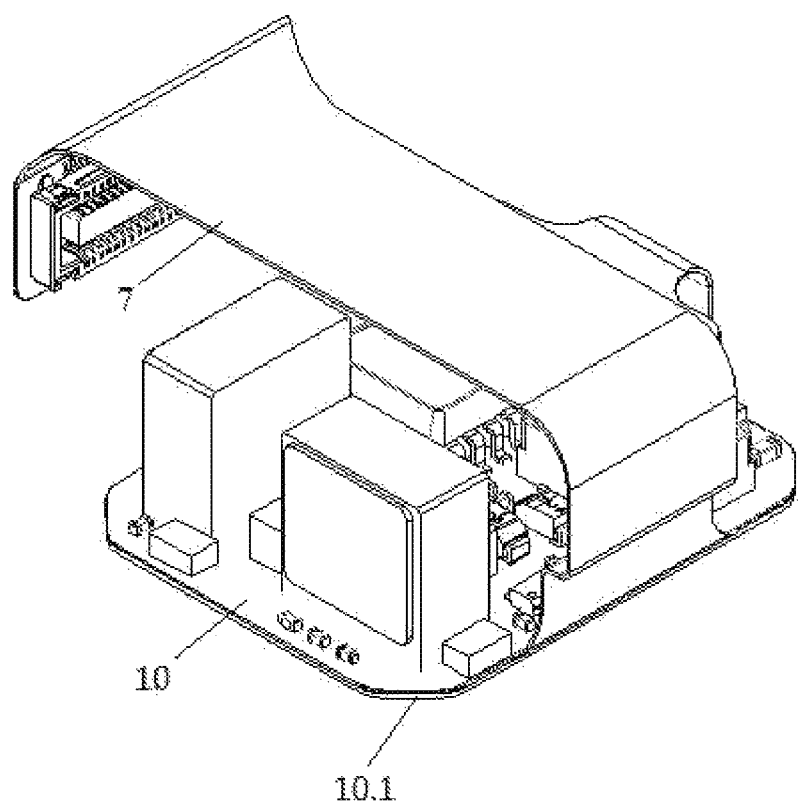
FIG. 3 is a structure diagram of a first integrated circuit board according to an embodiment of the present disclosure.
Figure 4:
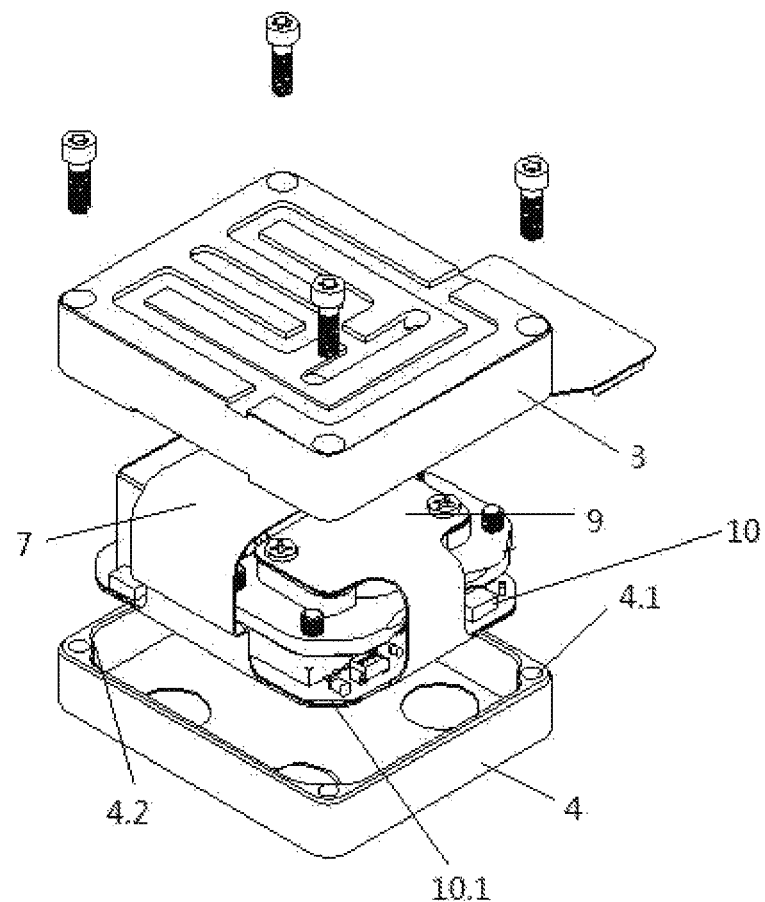
FIG. 4 is a structure diagram of the cooperation of a first weighting piece, a second weighting piece and sensor components according to an embodiment of in the present disclosure.

According to FIG. 3 and FIG. 4, the sensor components described above may include at least one integrated circuit board, an inertial sensor (not shown) connected to the integrated circuit board and a barometric sensor (not shown) connected to the integrated circuit board. In one or more embodiments, the at least one integrated circuit board includes a first integrated circuit board 10 and a second integrated circuit board 9. The first integrated circuit board 10 and the second integrated circuit board 9 are connected to each other by a first flexible flat cable (not shown). The inertial sensor and a second flexible flat cable 7 may be arranged on the first integrated circuit board 10. The inertial sensor may include a gyroscope and a accelerometer. The signal from the inertial sensor is delivered to other devices through flexible flat cables, which can improve the reliability, effectiveness, stability and precision of the measurement dates. The second flexible flat cable 7 may be connected to the control circuit board for flight control of the unmanned aerial vehicle. The barometric sensor may be arranged on the second integrated circuit board 9.

As shown in FIG. 1, the vibration damping components described above may include a first cushion 2, a first weighting piece 3, a second weighting piece 4 and a second cushion 6, which are connected from top to bottom and disposed in the annular housing 5. The upper metal sheet 1 on the shell compresses on the first cushion 2, and the lower metal sheet 11 on the shell compresses under the second cushion 6. The first cushion 2, the first weighting piece 3, the second weighting piece 4 and the second cushion 6 are compressed in the annular housing 5 by the upper metal sheet 1 and the lower metal sheet 11, such that the positions of the first cushion 2, the first weighting piece 3, the second weighting piece 4 and the second cushion 6 are stable.

In one or more embodiments, a slot with an impassable bottom may be formed at middle part of the first cushion 2. The bottom of the first cushion 2 is fixed on the top surface of the first weighting piece 3 by means of an adhesive plate 8. The top surface of the first cushion 2 may be fixed on the bottom surface of the upper metal sheet 1 by means of an adhesive plate 8. The adhesive plate 8 on the bottom surface of the first cushion 2 is not slotted. The adhesive plate 8 on the top surface of the first cushion 2 may be slotted at the middle part or may not be slotted according to the requirements. The second flexible flat cable 7 may be disposed in the slot of the first cushion 2 to save space.

The second cushion 6 may have a shape of a hollow rectangular plate. The middle part of the second cushion 6 may have a through-hole. The through-hole can improve the effect of vibration damping of the second cushion 6. The top surface of the second cushion 6 may be adhered to the bottom surface of the second weighting piece 4 by means of the adhesive plate 8. The bottom surface of the second cushion 6 may be adhered to the top surface of the lower metal sheet 11 by means of the adhesive plate 8. Holes, each having the same size as the through-hole, may be opened in the middle part of the adhesive plates 8 on the both sides of the second cushion 6. The holes each may has a shape of square, round or oval.

The manner in which the cushions are fixed by means of the adhesive plates 8 as described above can reduce the time and cost required for fixing multiple components, thereby improving the integration level of the inertial measurement device and decreasing the vibration.

In this embodiment, both the first cushion 2 and the second cushion 6 may be made of porous and breathable material. This can avoid local turbulence caused by the wind at excessive speed, buffer isolation vibration, reduce common vibration frequency and buffer high-speed turbulence. In this embodiment, both the first cushion 2 and the second cushion 6 described above may be made of vibration damping cotton. The vibration damping cotton has a good elasticity, so that the vibration of the sensor components caused by the unmanned aerial vehicle can attenuate rapidly.

Accommodating cavities (not shown) for accommodating integrated circuit boards may be formed between the first weighting piece 3 and the second weighting piece 4. As shown in FIG. 4, the first integrated circuit board 10 of the integrated circuit boards may be disposed in the second weighting piece 4. At least one holding cavity 3.1 and a pressure chamber 3.2 may be formed in the first weighting piece 3. The number of the at least one holding cavity 3.1 may be two. The two holding cavities 3.1 maybe respectively used to accommodate a gyroscope and accelerometer of the inertial sensor. The pressure chamber 3.2 communicates with the exterior of the inertial measurement device and may respectively accommodate the second integrated circuit board 9 and the barometric sensor on the second integrated circuit board 9. The arrangement of the sensor components in the inner space of the first weighting piece 3 and the second weighting piece 4 can avoid the need for additional space for the sensor components, which increases the integration level of the inertial measurement device, reduces the influence of the vibration on the inertial sensor and reduce interference from high speed turbulence to the barometric sensor, thus improving the precision of measurement of the inertial sensor and the barometric sensor.

In this embodiment, the first weighting piece 3 and the second weighting piece 4 each may have a shape of rectangular, which can reduce the installation space of the first weighting piece 3 and the second weighting piece 4. The first weighting piece 3 and the second weighting piece 4 described above may be made of metal. The density of metal makes the first weighting piece 3 and the second weighting piece 4 each have a certain weight, thus decreasing the vibration of the sensor components in the first weighting piece 3 and the second weighting piece 4. In one or more embodiments, as shown in FIG. 4, a rectangular slot is arranged in the second weighting piece 4. The rectangular slot may be used for accommodating the first integrated circuit board 10. The arrangement of the rectangular slot can save space, make the first integrated circuit board 10 dissipate heat quickly and evenly, so as to avoid the short circuit caused by too much heat at a part of the first integrated circuit and prolong the service life of components on the first integrated circuit board 10.

In this embodiment, since the first weighting piece 3 may have only the holding cavities 3.1 and the pressure chamber 3.2, the weight of the first weighting piece 3 is greater than the weight of the second weighting piece 4. This reduces the vibration frequency of the inertial measurement device, so that the sensor components in the first weighting piece 3 and the sensor components in the second weighting piece 4 are in a stable environment.

Figure 7:
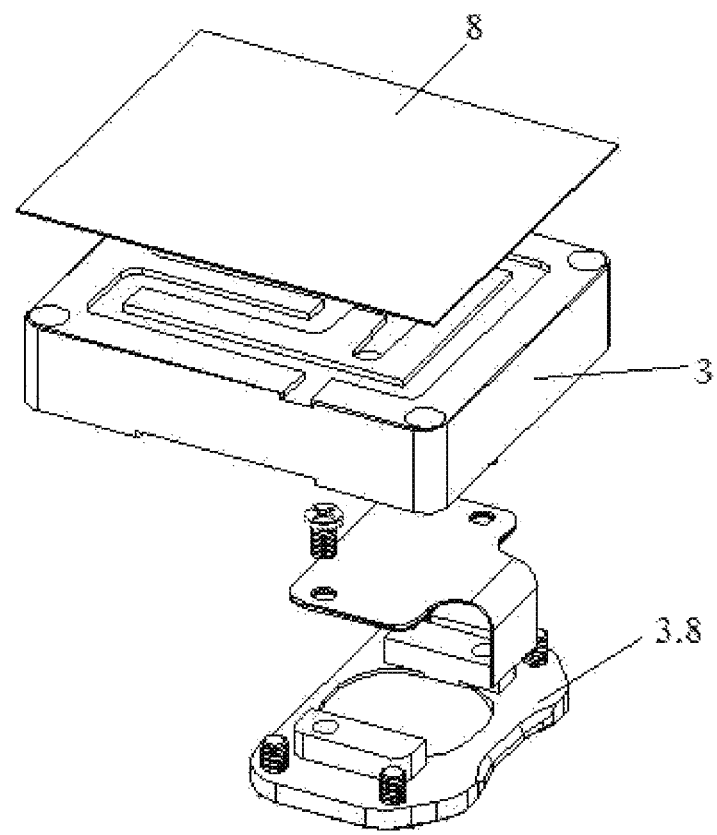
FIG. 7 is an exploded structure diagram of a first weighting piece according to an embodiment of the present disclosure.

In one or more embodiments, as shown in FIG. 7, a sealing cover 3.8 is installed on the pressure chamber 3.2.

The sealing cover 3.8 is fastened to the pressure chamber 3.2 by connectors. The sealing cover 3.8 is used to seal the pressure chamber 3.2. Four through-holes may be arranged on the sealing cover 3.8. Threaded holes are set in the positions corresponding to the pressure chamber 3.2 in the first weighting piece 3. The sealing cover 3.8 is connected to the pressure chamber 3.2 through the connectors. In this embodiment, the connectors may be screws.

Figure 8:
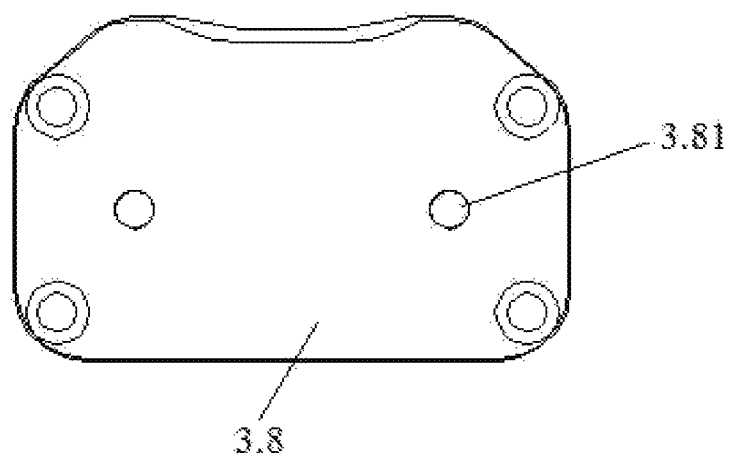
FIG. 8 is a structure diagram of a sealing cover on a pressure chamber according to an embodiment of the present disclosure.

In one or more embodiments, as shown in FIG. 8, there are two blind-holes 3.81 with internal threads on the sealing cover 3.8. When the sealing cover 3.8 is detached, screws with external threads may be screwed into the blind-holes with internal threads. The sealing cover 3.8 can be detached by pulling the sealing cover 3.8 outward by means of the screws. The operation is simple and convenient.

In this embodiment, the accommodating cavities formed by the first weighting piece 3 and the second weighting piece 4 may be filled with the thermally conductive silicone grease. The filled thermally conductive silicone grease can mitigate the vibration, keep the temperature of all the components on the first integrated circuit board 10 in the second weighting piece 4 within a certain range and evenly heated, and avoid the vibration from the components themselves. The filled thermally conductive silicone grease enables multiple components on the integrated circuit board to form a whole and vibrate at a same frequency to mitigate the vibration.

Furthermore, in this embodiment, since the thermally conductive silicone grease can possibly influence the air pressure in the pressure chamber 3.2, the pressure chamber 3.2 is arranged on the first weighting piece 3 and is sealed by the sealing cover 3.8, such that the pressure chamber 3.2 is isolated from the accommodating cavities formed between the first weighting piece 3 and the second weighting piece 4. This avoids the influence of thermally conductive silicone grease on the air pressure inside the pressure chamber 3.2 and improves the precision of the measurement results from the barometric sensor in the pressure chamber 3.2.

Figure 6:
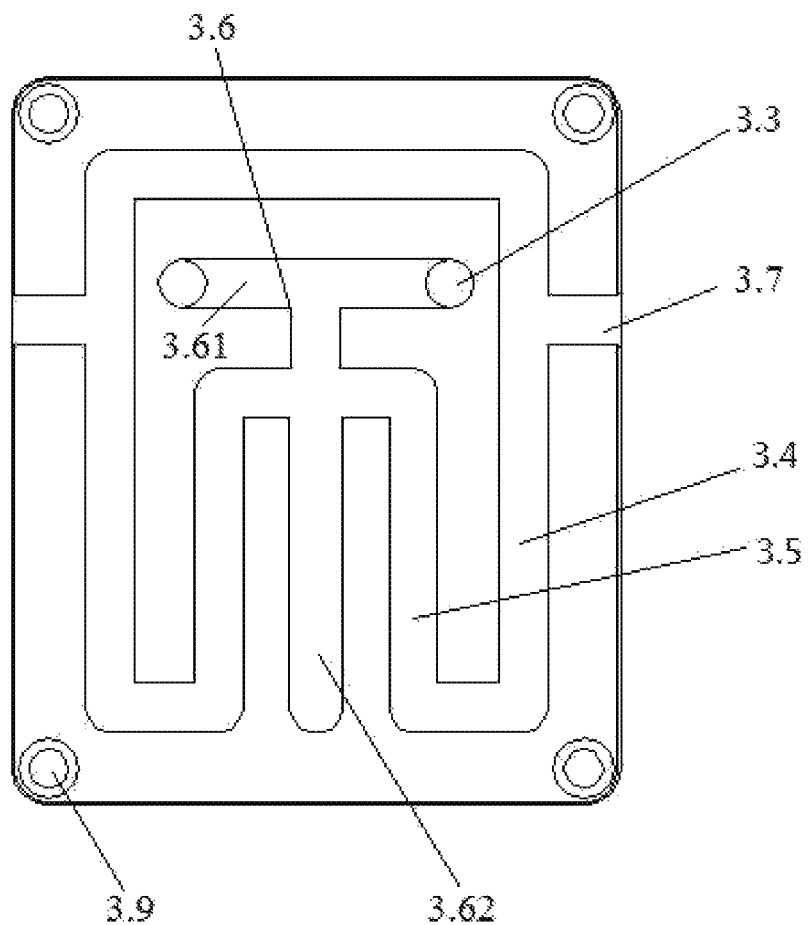
FIG. 6 is a structure diagram 2 of a first weighting piece according to an embodiment of the present disclosure.

In this embodiment, optionally, as shown in FIG. 6, an airflow channel communicating with the exterior of the inertial measurement device is arranged in the top surface of the first weighting piece 3. Slots are formed in the top surface of the first weighting piece 3. The adhesive plate 8 is adhered to the top surface of the first weighting piece 3 and forms the airflow channel with the slots. Baroports are arranged in the first weighting piece 3 to connect the airflow channel and the pressure chamber 3.2. The arrangement of the baroports 3.3 and the airflow channel enables that the internal pressure of the pressure chamber 3.2 is the same as that of the external air pressure, so as to buffer and isolate vibration, and buffer the high-speed turbulence. The airflow channel may also be arranged in the first weighting piece 3 as long as the pressure chamber 3.2 communicates with the exterior.

In this embodiment, the airflow channel describe above may include peripheral channels 3.4, inner channels 3.5 and a T-shaped channel 3.6. The T-shaped channel 3.6 may include a transverse channel 3.61 and a longitudinal channel 3.62 connected to a midpoint of the transverse channel 3.61. The baroports 3.3 may be symmetrically connected to both ends of the transverse channel 3.61. In one or more embodiments, the inner channels 3.5 are symmetrically connected to both sides of the longitudinal channel 3.62. Each of the inner channels 3.5 is connected to a peripheral channel 3.4. Two peripheral channels 3.4 are interconnected and each of the peripheral channels 3.4 is connected to one of multiple air inlets 3.7. Air may enter the airflow channel through the air inlets 3.7, and enter the pressure chamber 3.2 through the baroports 3.3. In this embodiment, both the inner channels 3.5 and the peripheral channels 3.4, which are symmetrically arranged, constitute a gate structure.

The external high-speed turbulence enters a first air inlet 3.7 and is divided into two streams into the peripheral channels 3.4. The first stream is offset by a stream from a second air inlet 3.7 at the connection of the two peripheral channels 3.4. The second stream passes through the peripheral channel 3.4 and enters an inner channel 3.5. The stream entering the inner channel 3.5 is divided into a first part and a second part while passing through the T-shaped channel 3.6. The first part enters the pressure chamber 3.2 through a baroport 3.3 on the transverse channel 3.61. The second part flows to the longitudinal channel 3.62, returns after reaching the bottom of the longitudinal channel 3.62, and flows into the pressure chamber 3.2 through the baroport 3.3.

In this embodiment, the peripheral channels 3.4, the inner channels 3.5, the T-shaped channel 3.6 and the two air inlets 3.7, may be regarded as forming two inlet channels which are symmetric with each other. The two inlet channels enable an air convection to be formed in the pressure chamber 3.2. This balances the pressure difference between the internal pressure and the external pressure, buffers and isolates turbulence, such that the local environment of high-speed and low-pressure produced by a single inlet channel in the related arts is avoided. Each inlet channel has a bending shape formed by a peripheral channel 3.4, an inner channel 3.5 and the T-shaped channel 3.6, which buffers the high-speed turbulence and avoids the influence of the high-speed turbulence on the measurements of sensors.

Figure 5:
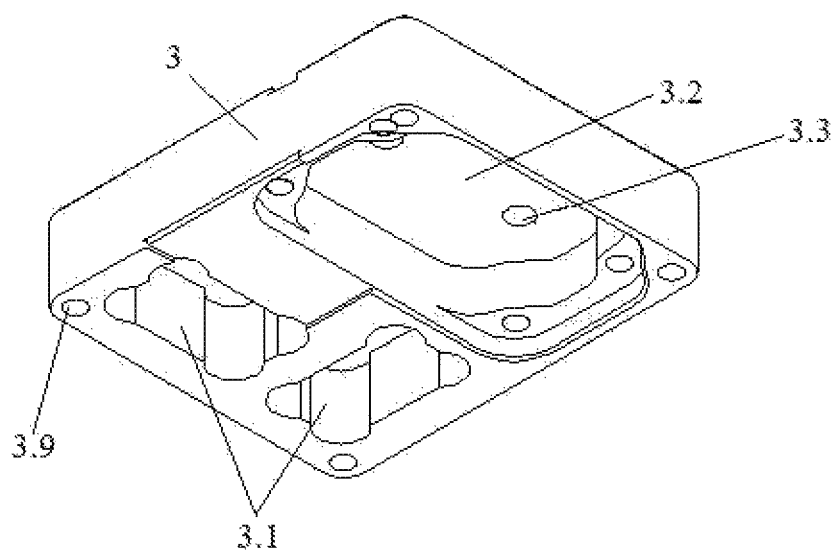
FIG. 5 is a structure diagram 1 of a first weighting piece according to an embodiment of the present disclosure.

In one or more embodiments, as shown in FIG. 4 and FIG. 5, each of the four corners of the first weighting piece 3 and the second weighting piece 4 is provided with a convex platform. Each convex platform has a connecting hole. The first weighting piece 3 and the second weighting piece 4 are fastened together by means of connectors in the connecting holes. The connecting holes in the first weighting piece 3 may be called as first connecting holes 3.9, and the first connecting holes 3.9 may be through-holes. The connecting holes in the second weighting piece 4 may be called as second connecting holes 4.1, and the second connecting holes 4.1 may be threaded holes. The connectors may be screws.

In one or more embodiments, as shown in FIG. 4, the first integrated circuit board 10 in this embodiment has a shape of quadrangle, and the four corners are cut to form hypotenuses 10.1. Correspondingly, the convex platforms at the four corners of the second weighting piece 4 each is convex to the interior to form a curved surface with an arc-shaped surface 4.2. The arc-shaped surface 4.2 is tangent to the hypotenuse 10.1 at a corresponding one of the four corners of the first integrated circuit board 10. This structure makes the first integrated circuit board 10 fixed firmly, can have the function of limitation and fixation, avoid the loosening of the first integrated circuit board in use, facilitate the assembly, and improve the precision of measurement of the inertial sensor.

In this embodiment, the structure described above improves the integration level of the entire inertial measurement device. Furthermore, the structure can reduce the influence from the external factors on the measurement performed by the inertial sensor and the barometric sensor, and improve the precision of measurement of the inertial measurement device.

INDUSTRIAL APPLICABILITY

The present disclosure provides an inertial measurement device and an unmanned aerial vehicle, which improve the integration level, the effect of vibration damping, and the precision of measurement of sensors of the inertial measurement device.

What is claimed is:

1. An inertial measurement device, comprising:
   a shell;
   a plurality of sensor components installed in the shell, wherein the sensor components comprise an integrated circuit board, an inertial sensor connected to the integrated circuit board, and a barometric sensor connected to the integrated circuit board; and
   a plurality of vibration damping components installed in the shell, wherein the vibration damping components comprise a first cushion, a first weighting piece, a second weighting piece and a second cushion which are connected successively, wherein the integrated circuit board is between the first weighting piece and the second weighting piece, the first weighting piece has a holding cavity for accommodating the inertial sensor and a pressure chamber accommodating the barometric sensor and communicating with an exterior of the inertial measurement devices;
   wherein an airflow channel communicating with the exterior of the inertial measurement device is formed in a top surface of the first weighting piece, and the first weighting piece has a plurality of baroports for connecting the airflow channel to the pressure chamber;
   wherein the airflow channel comprises a T-shaped channel, two peripheral channels, and two inner channels;
   wherein the T-shaped channel comprises a transverse channel and a longitudinal channel closed at one end and connected to a midpoint of the transverse channel at the other end, the plurality of baroports are symmetrically connected to ends of the transverse channel, and the inner channels are symmetrically connected to a middle portion of the longitudinal channel
   wherein the two inner channels each is connected to a respective one of the two peripheral channels, the two peripheral channels are connected to each other and surround the T-shaped channel, and the two peripheral channels each has an air inlet.

2. The inertial measurement device according to claim 1, comprising at least one structure of a group consisting of:
   the bottom surface of the first cushion is fastened to the top surface of the first weighting piece by means of an adhesive plate, and the airflow channel is formed between the first weighting piece and the adhesive plate; and
   the bottom surface and the top surface of the second cushion are respectively fastened to the shell and the bottom surface of the second weighting piece.

3. The inertial measurement device according to claim 1, wherein the shell comprises an annular housing, a first metal sheet and a second metal sheet, the first metal sheet and the second metal sheet are respectively located on a top surface and a bottom surface of the annular housing, the sensor components and the vibration damping components are arranged in the annular housing and are compressed by the first metal sheet and the second metal sheet.

4. The inertial measurement device according to claim 3, wherein opposite edges of the first metal sheet each extends at least one first male tab towards the annular housing, opposite edges of the second metal sheet each extends at least one second male tab towards the annular housing, the at least one first male tab and the at least one second male tab are inserted into the annular housing and contacting with an inwall of the annular housing.

5. An unmanned aerial vehicle, comprising an inertial measurement device, wherein the inertial measurement device comprises:
   a shell;
   a plurality of sensor components installed in the shell, wherein the sensor components comprise an integrated circuit board, an inertial sensor connected to the integrated circuit board, and a barometric sensor connected to the integrated circuit board; and
   a plurality of vibration damping components installed in the shell, wherein the vibration damping components comprise a first cushion, a first weighting piece, a second weighting piece and a second cushion which are connected successively, wherein the integrated circuit board is between the first weighting piece and the second weighting piece, the first weighting piece has a holding cavity for accommodating the inertial sensor and a pressure chamber accommodating the barometric sensor and communicating with an exterior of the inertial measurement device;
   wherein an airflow channel communicating with the exterior of the inertial measurement device is formed in a top surface of the first weighting piece, and the first weighting piece has a plurality of baroports for connecting the airflow channel to the pressure chamber;
   wherein the airflow channel comprises a T-shaped channel, two peripheral channels, and two inner channels;
   wherein the T-shaped channel comprises a transverse channel and a longitudinal channel closed at one end and connected to a midpoint of the transverse channel at the other end, the plurality of baroports are symmetrically connected to ends of the transverse channel, and the inner channels are symmetrically connected to a middle portion of the longitudinal channel
   wherein the two inner channels each is connected to a respective one of the two peripheral channels, the two peripheral channels are connected teach other and surround the T-shaped channel, and the two peripheral channels each has an air inlet.

6. The unmanned aerial vehicle according to claim 5, comprising at least one structure of a group consisting of:
   the bottom surface of the first cushion is fastened to the top surface of the first weighting piece by means of an adhesive plate, and the airflow channel is formed between the first weighting piece and the adhesive plate; and
   the bottom surface and the top surface of the second cushion are respectively fastened to the shell and the bottom surface of the second weighting piece.

7. The unmanned aerial vehicle according to claim 5, wherein the shell comprises an annular housing, a first metal sheet and a second metal sheet, the first metal sheet and the second metal sheet are respectively located on a top surface and a bottom surface of the annular housing, the sensor components and the vibration damping components are arranged in the annular housing and are compressed by the first metal sheet and the second metal sheet.

8. The unmanned aerial vehicle according to claim 7, wherein opposite edges of the first metal sheet each extends at least one first male tab towards the annular housing, opposite edges of the second metal sheet each extends at least one second male tab towards the annular housing, the at least one first male tab and the at least one second male tab are inserted into the annular housing and contacting with an inwall of the annular housing.

* * * * *